March 7, 1939. H. W. GILLETT ET AL 2,149,596

METHOD FOR PRODUCING METALLIC MATERIAL

Filed June 8, 1936

INVENTORS
HORACE W. GILLETT
RUSSELL W. DAYTON
BY
ATTORNEYS

Patented Mar. 7, 1939

2,149,596

UNITED STATES PATENT OFFICE

2,149,596

METHOD FOR PRODUCING METALLIC MATERIAL

Horace W. Gillett and Russell W. Dayton, Columbus, Ohio, assignors to The Bunting Brass & Bronze Company, Toledo, Ohio, a corporation of Ohio Application June 8, 1936, Serial No. 84,233

9 Claims. (Cl. 75—22)

The invention relates to the production of integrated metallic materials or articles from comminuted metallic materials. More particularly it relates to the manufacture of porous non-ferrous articles, such as bronze rods or bushings, from scrap materials such, for instance, as are obtained from the machining of bronze. Our invention contemplates a new integrated material having different properties from those heretofore known; it also includes a new process for obtaining such material and a novel apparatus.

One of the objects of the invention is to successfully utilize scrap materials, such as bronze machinings, and thereby convert a waste product of little value into a product of economic importance.

Another object is to obtain metallic materials having such properties as to adapt the same for many useful purposes such, for example, as oilless bearings and other articles where a certain degree of porosity is desired.

A further object is to obtain a process for integrating comminuted materials in such a way as to control the porosity of the final material and also to control the ratio of the closed pores to the open pores which have absorptive power.

Another object of the invention is to obtain a process for integrating materials to obtain desirable chemical and physical properties.

These and other objects may be obtained by utilizing the apparatus and the methods hereinafter more fully described and illustrated in the accompanying drawing, wherein Figure 1 is a diagrammatic view showing an elevation of one form of apparatus;

Figure 1:
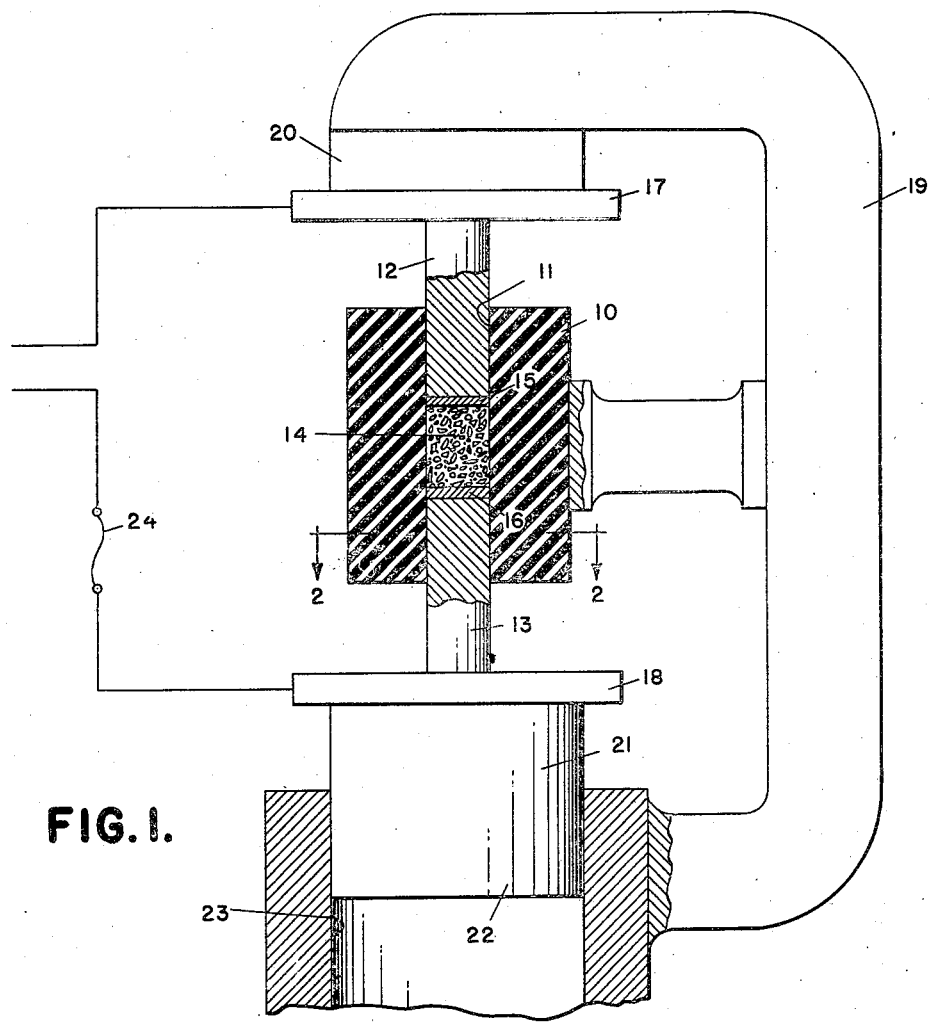
Figure 2:
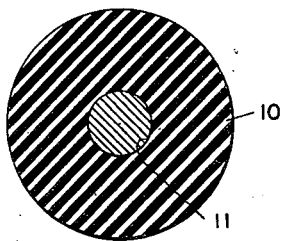
Figure 2 is a cross sectional view thereof on the line 2—2 of Figure 1.

Referring now to the apparatus as illustrated in Figures 1 and 2, 10 represents a hollow cylinder made of a suitable refractory material, the desirable characteristics of which are that it is hard, abrasive-resistant, spall-resistant, heat-resistant and having high electrical resistivity. A suitable material for this purpose is one formed from compressed asbestos known by the tradename Transite. However, other materials, having characteristics as indicated above, may also be used. The cylinder bore 11 has inserted therein at opposite ends thereof the cylindrical electrodes 12 and 13 which are composed of materials having good electrical conductivity and other properties characteristic of the standard welding electrodes. Between the two electrodes is placed the comminuted material 14 which is to be integrated by the process. Such material may, for the purpose of illustration, be considered to be bronze machinings. It has been found preferable to place between the metal particles 14 and the ends of the electrodes relatively thin washers 15 and 16 constructed of material whose electrical and thermal conductivity approaches the average conductivity of the mass of metal particles. As shown, these washers are separate members, but if desired they may be formed integral with the electrodes, or the ends of the electrodes themselves may be suitably modified to obtain the characteristics desired. The electrodes 12 and 13 are electrically connected to bus bars 17 and 18 and the entire device is placed in a suitable press 19 which serves to regulate the pressure between the electrodes and to provide the necessary movement of the electrodes. As diagrammatically illustrated, the press has the upper fixed bearing plate 20 and a lower movable bearing plate 21, the latter having a piston shank 22 slidable within a hydraulic cylinder 23.

In the operation of the apparatus as thus far described, a predetermined amount of comminuted metal particles is placed between the washers at the ends of the electrodes and a predetermined pressure is applied to the electrodes by means of the hydraulic press. The electric circuit is then completed causing the current to pass from one electrode to the other through the metal particles. A suitable timing device is provided for determining the length of time of the current flow, and one simple form of such timing device consists of a fuse 24 of such material and dimensions as to blow after a predetermined time interval. In the preferred embodiment of the invention, the apparatus is constructed to use a high current density, passing for a short interval of time as it has been found that these conditions improve the physical properties of the integrated material. The integration is accomplished by the combined influences of the passage of the electric current and the pressure on the electrodes.

Figure 3:
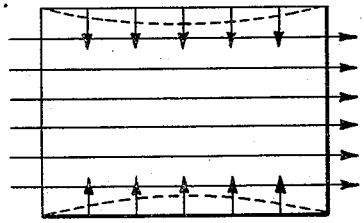
Figure 3 is a diagram illustrating the pinch effect.

One of the important features of this invention consists in so determining the pressure on the electrodes as to obtain the maximum benefit from the pinch effect. The pinch effect caused by the passage of the electric current tends to draw the comminuted materials together diametrically away from the side walls of the cylinder as indicated in Figure 3. By balancing the axial pressure on the electrodes with that due to the pinch effect, a true hydrostatic pressure is produced, resulting in a product free from planes of weakness. Thus the pressure must be properly determined to compensate for the tendencies of the particles to move inwardly away from the side walls and to maintain the particles in substantial contact with the side walls. As there is a shrinkage during the integration, it is essential not only that the pressure should be maintained at the desired value, but also that the apparatus be capable of quickly following up the shrinkage effect and to maintain the particles in full volume within the cylinder and between the electrodes.

When the passage of the current through the mass is discontinued by the timing device, the comminuted particles have become an integrated mass and may be removed from the cylinder. The chemical and physical properties of the integrated material depend upon the relation of the variable factors, and a discussion of these factors is hereinafter given.

In order to illustrate some of the important features of the invention, a number of examples of specific tests will be given. In these tests the apparatus used was the construction illustrated in Figures 1 and 2 in which the diameter of the cylinder 11 is one-half inch and the distance between the electrodes may be varied from one-quarter inch to one-and-one-half inches. The current used was 1770 amperes. The comminuted material consisted of chamferings from a non-ferrous alloy containing 80% copper, 10% tin and 10% lead. The chamferings were irregularly shaped particles having greater length than width and of a size such that all would pass a 30-mesh sieve and stay on a 40-mesh sieve. When these chamferings were integrated according to our process into a mass one-half inch long, the following table illustrates the compressional strength of different products under certain varying conditions:

| Test | Pressure, lbs. per sq. in. | Time, seconds | Percent density | Compressional strength, lbs. per sq. in. |
| --- | --- | --- | --- | --- |
| 1 | 750 | 10 | 95 | 150,000 |
| 2 | 750 | 8 | 75 | 104,000 |
| 3 | 1,500 | 10 | 70 | 91,000 |

In the above table the metal chamferings were cleaned prior to being subjected to the process. Where the material was used without cleaning, it was found that the compressional strength was reduced from 150,000 pounds per square inch, as indicated in Test No. 1, to 120,000 pounds per square inch.

It will be observed from the above tests that there is a relationship between the density of the final material and the compressional strength thereof. As the material becomes more dense, it also has a higher compressional strength. It is of interest also to note that with a constant pressure as in Tests 1 and 2, a lower time interval for the current passage results in a product of greater porosity and lesser compressional strength than a greater time of treatment. Also comparing Tests 1 and 3 where the time remains constant, a greater pressure on the electrodes increases the porosity and lowers compressional strength.

As will be noted in the table, with other conditions remaining constant and within the low pressure ranges contemplated herein, an increase of pressure results in an increase of porosity and a corresponding decrease in strength of the finished material. The density of the article does not depend upon the mold pressure per se, because the pressures are so low that they cannot deform the cold particles to any substantial extent. The extent of sintering is, however, very dependent upon the amount of electrical heat generated in the mass of particles. As is well understood, in a mass of compressed particles, the electrical resistance of the mass decreases very rapidly as the pressure is increased, because the majority of the resistance is contact resistance, between one particle and another, for this decreases as the contact is improved by higher pressures. The line resistance being substantially constant higher pressure causes a lower resistance to an electrical current in the mold and therefore a smaller amount of heat generated within the mold. Furthermore, at the lower pressures, the heat generated by the passage of the electric current is substantially limited to the points of contact between adjacent particles. The effect may be likened to relatively intense local heat at the points of contact with only incidental and substantially lower heating of the bodies of the particles. For these reasons higher pressures cause a less complete sintering and a greater porosity.

One of the important uses of our invention is to produce materials having a high degree of porosity. Such material may be used, for example, to construct self-lubricating bearings in which the lubricating agent is absorbed in the pores of the material. It will be observed from the above tests that the degree of porosity may be varied at will by varying the factors of time and pressure.

As previously indicated, one of the important features of our invention is that our process utilizes the pinch effect to provide a stronger product free from planes of weakness. It is therefore important that the mechanism for applying axial pressure to the electrodes be capable of maintaining the desirable balance between axial pressure and the radial pressure due to the pinch effect. In general therefore, the pressure should be such that it is limited on the low side to such a pressure as will prevent the particles from being moved away from the cylinder walls. The mechanism must also have sufficient speed to cause the electrodes to follow up the shrinkage which occurs during the process and thereby maintain electrical contact. The pressure may be increased to greater values whenever this is necessary or desirable to obtain the desired characteristics in the final material.

It was previously pointed out that the washers 15 and 16 should have certain thermal characteristics. The thermal conductivity should be such that it approaches the average of the thermal conductivity of the mass between its initial and final conditions. Thus copper is not desirable because its thermal conductivity is too high, while graphite has too low a conductivity. The ferrous metals have been found to be satisfactory, either iron or mild steel, but in lieu thereof many other materials might be substituted such, for example, as aluminum-bronze, nickel and some other rarer metals and alloys, the use of which however is not required since the less expensive materials are satisfactory.

In carrying out our process it is preferable to use clean materials since a better final material will result. It is also desirable to carry out the reaction in a controlled atmosphere to prevent any oxidation. The atmosphere may be a neutral gas such as nitrogen, a reducing gas such as hydrogen, or a reducing atmosphere may be obtained by the decomposition of organic liquids such as alcohol or lower hydrocarbons mixed with the metal particles. During welding, such liquids will volatilize and force their way out of the material, insuring that the porosity is continuous from one hole to the next.

Another modification of a process consists in de-airing or replacing the air in the pressed article before welding by butane or some other suitable gas.

While the example described above illustrates the process as being used on a certain non-ferrous alloy, it may also be used on various other alloys. If desired, any material of benefit to the final product, such for example as graphite, can be mixed with the comminuted materials.

By the regulation of time and pressure during the welding operation, material of any desired degree of porosity can result from 0 to 40%. The porous articles are particularly adapted for such uses as self-lubricating bearings, oil filters and many other similar uses. An article with no porosity has properties similar to a cast material. Our method when used for such an article eliminates melting losses, molding costs and dangers of defective materials due to gas and segregation and, in addition, forms such a non-porous material from scrap material having little value for any other purpose. Another modification of our invention consists in using comminuted particles of an alloy having as high a lead content as can be satisfactorily obtained by casting methods and adding additional lead to the mixture. After the integrating process, a final product is then obtained having exceptionally high lead content.

Another modification of our invention consists in utilizing powdered or comminuted metals of different composition in such proportions as to obtain a final product comprising an alloy of these metals in the desired proportions.

From the above, it will be evident that our invention is susceptible of various modifications and that it includes the development of new metallic materials as well as a new process and a new type of apparatus for forming integrated materials from comminuted materials.

What we claim as our invention is:

1. The method of reclaiming scrap machinings of an alloy such as bronze having high electrical conductivity, which comprises confining said machinings, passing electric current through said machinings of a current density sufficient to cause a strong pinch effect, applying the minimum pressure to said machinings necessary to balance the pinch effect, and discontinuing the passage of current after a predetermined interval.

2. The process of making an integrated material which comprises passing an electric current of sufficient current density to cause the pinch effect through a mass of cuprous alloy machinings, maintaining pressure on said mass just sufficient to prevent said pinch effect from pinching off said mass, and discontinuing said current after a brief interval.

3. The process of making an integrated material which comprises closely confining a mass of metallic particles in a receptacle of variable volume, passing a sintering current through said confined particles, the current being of sufficient density to cause a pinch effect, apply a pressure simultaneous with the passage of current, by varying the volume of said receptacle, the value of such pressure being the minimum pressure which will balance said pinch effect and maintain said particles in substantial contact with the sides of said receptacle, and discontinuing said current and pressure as soon as sintering is complete.

4. The process of making an integrated material which comprises closely confining a mass of metallic particles in a receptacle of variable volume, passing a sintering current through said confined particles, the current being of sufficient density to cause a pinch effect, apply a pressure simultaneous with the passage of current, by varying the volume of said receptacle, the value of such pressure being the minimum pressure which will balance said pinch effect and maintain said particles in substantial contact with the sides of said receptacle, said particles being machinings of a copper containing alloy, and discontinuing said current and pressure as soon as sintering is complete.

5. The process of making an integrated porous material which comprises placing comminuted metallic particles in an insulating mold, passing an electric current therethrough of sufficient current density to cause a pinch effect, maintaining said particles under a pressure within a limited range just above a pressure sufficient to balance the pinch effect, and discontinuing said current after a predetermined interval.

6. The process of making an integrated porous material which comprises placing comminuted metallic particles in an insulating mold in contact with spaced electrodes having an electrical and thermal conductivity which approaches the average electrical and thermal conductivity of the mass of particles, passing an electric current therethrough of sufficient current density to cause a pinch effect, maintaining said particles under a pressure only slightly greater than sufficient to balance the pinch effect, and discontinuing said current after a predetermined interval.

7. The process of making an integrated porous material which comprises placing comminuted metallic particles in an insulating mold in contact with spaced electrodes having an electrical and thermal conductivity which approaches the average electrical and thermal conductivity of the mass of particles, passing an electric current therethrough of sufficient current density to cause a pinch effect, maintaining said particles under a pressure only slightly greater than sufficient to balance the pinch effect by relatively moving said electrodes, and discontinuing said current after a predetermined interval.

8. The process of making an integrated porous material which comprises placing comminuted metallic particles in an insulating mold in contact with spaced electrodes having an electrical and thermal conductivity which approaches the average electrical and thermal conductivity of the mass of particles, passing an electric current therethrough of sufficient current density to cause a pinch effect, maintaining said particles under a pressure only slightly greater than sufficient to balance the pinch effect by applying a substantially constant force between said electrodes, and discontinuing said current after a predetermined interval.

9. The process of making an integrated porous material which comprises placing comminuted metallic particles in an insulating mold, passing an electric current therethrough of sufficient current density to cause a pinch effect, applying a pressure to said particles by application of force substantially transverse to the direction of action of said pinch effect, said pressure being within a limited range just above the pressure necessary to balance said pinch effect, and discontinuing said current after a predetermined interval.

HORACE W. GILLETT.
RUSSELL W. DAYTON.